US011046376B2

(12) United States Patent
Henry et al.

(10) Patent No.: US 11,046,376 B2
(45) Date of Patent: Jun. 29, 2021

(54) UNDERCARRIAGE ASSEMBLY FOR A ROPE SHOVEL

(71) Applicant: FLSmidth A/S, Valby (DK)

(72) Inventors: Aaron Lee Henry, Manito, IL (US); Ryan William Henry, Galesburg, IL (US); Dave Eagan, Strawberry, AZ (US)

(73) Assignee: FLSmidth A/S

( * ) Notice: Subject to any disclaimer, the term of this patent is extended or adjusted under 35 U.S.C. 154(b) by 300 days.

(21) Appl. No.: 16/009,428

(22) Filed: Jun. 15, 2018

(65) Prior Publication Data
US 2019/0382064 A1    Dec. 19, 2019

(51) Int. Cl.
| | | |
|---|---|---|
| *B62D 55/15* | (2006.01) | |
| *B62D 55/10* | (2006.01) | |
| *E02F 9/02* | (2006.01) | |
| *B62D 55/14* | (2006.01) | |
| *B62D 55/088* | (2006.01) | |
| *B62D 55/06* | (2006.01) | |
| *E02F 3/30* | (2006.01) | |

(52) U.S. Cl.
CPC ........... *B62D 55/15* (2013.01); *B62D 55/088* (2013.01); *B62D 55/10* (2013.01); *B62D 55/14* (2013.01); *E02F 9/02* (2013.01); *B62D 55/06* (2013.01); *E02F 3/308* (2013.01)

(58) Field of Classification Search
CPC .............. B62D 55/088; B62D 55/0887; B62D 55/014; B62D 55/015; B62D 55/0847; B62D 55/10
See application file for complete search history.

(56) References Cited

U.S. PATENT DOCUMENTS

| | | | | |
|---|---|---|---|---|
| 6,435,628 B1* | 8/2002 | Hasselbusch | ...... | B62D 55/0847 305/109 |
| 6,851,768 B2* | 2/2005 | Takeno | ................. | B62D 55/21 29/894.012 |
| 6,874,859 B1* | 4/2005 | Duse | ...................... | B62D 55/15 305/136 |
| 7,108,337 B2* | 9/2006 | Yamamoto | ............. | B62D 55/14 305/129 |
| 8,231,184 B2* | 7/2012 | Mulligan | ............... | B62D 55/15 305/136 |
| 8,979,219 B2* | 3/2015 | Hisamatsu | ........... | F16J 15/3256 305/136 |

(Continued)

OTHER PUBLICATIONS

Komatsu P&H 4100XPC Electric Mining Shovel—AC Drive Product Overview Brochure.

(Continued)

*Primary Examiner* — Jason R Bellinger
(74) *Attorney, Agent, or Firm* — Jeffrey A. Sharp

(57) ABSTRACT

An undercarriage assembly for a rope shovel includes a crawler frame having a roller component that is disposed at least partially below a crawler body between a first leg and a second leg. The roller component has a lateral roller component bore therethrough. A first crawler frame bushing having a first flanged end is disposed in and through a first lateral crawler frame bore. A roller component bushing-having a first flanged end is disposed in and through the lateral roller component bore, and the first flanged end of the first crawler frame bushing abuts the first flanged end of the roller component bushing.

10 Claims, 4 Drawing Sheets

(56) References Cited

U.S. PATENT DOCUMENTS

| | | |
|---|---|---|
| 9,454,147 B1 | 9/2016 | Friend et al. |
| 9,908,572 B2 * | 3/2018 | Brooks .................. B62D 55/08 |
| 10,696,337 B2 * | 6/2020 | Hawkins ................ B62D 65/00 |
| 2007/0024116 A1 * | 2/2007 | Yamamoto ............. F16C 3/023 |
| | | 305/136 |
| 2012/0056473 A1 * | 3/2012 | Hashimoto ............ B62D 55/14 |
| | | 305/136 |
| 2013/0102427 A1 | 4/2013 | Sandoval et al. |

OTHER PUBLICATIONS

Komatsu P&H 2800XPC Electric Mining Shovel—AC Drive Product Overview Brochure.
Bucyrus International Inc. 495HR Electric Mining Shovel Brochure.
Caterpillar 7495 Electric Rope Shovel Brochure.

* cited by examiner

UNDERCARRIAGE ASSEMBLY FOR A ROPE SHOVEL

FIELD OF THE INVENTION

The present invention relates to a rope shovel, and more particularly to an undercarriage assembly that reduces maintenance costs associated with wear on and to the crawler frame and minimizes downtime of the rope shovel during maintenance.

BACKGROUND OF THE INVENTION

Rope shovels are generally used to remove overburden and ore at mining sites. Typical electric rope shovels (e.g. Komatsu's P&H 4100, P&H 2800, P&H 2300; Bucyrus' 495 model; Caterpillar's 7495 model) utilize undercarriages with e.g. track pads, rollers, idlers, tumblers and drive shafts for mobility. An example of a rope shovel with a typical undercarriage may be appreciated from e.g. U.S. Pat. No. 9,454,147.

Rope shovel undercarriages are configured with a crawler frame having a lateral bore housing a shaft with a roller component disposed on the shaft that transfers machine loads onto a set of track pads or guide rails. During use, wear occurs between the shaft and the crawler frame. Such wear results in e.g. the bores in the crawler frame being worn down which requires weld repair and re-machining at each wear component change out. Weld repair and re-machining is costly and greatly increases the downtime of the rope shovel during maintenance.

OBJECT OF THE INVENTION

It is an object of the invention to overcome or at least alleviate one or more of the above problems and/or provide the consumer with a useful or commercial choice.

SUMMARY OF THE INVENTION

An undercarriage assembly for a rope shovel is provided. The undercarriage assembly may comprise a crawler frame further comprising a crawler body, a first leg and a second leg, the first leg having a first lateral crawler frame bore therethrough and the second leg having a second lateral crawler frame bore therethrough; a roller component disposed at least partially below the crawler body between the first leg and the second leg, the roller component having a lateral roller component bore therethrough; and a first crawler frame bushing disposed in and through the first lateral crawler frame bore.

In an exemplary embodiment of the undercarriage assembly, the undercarriage assembly may further comprise a roller component bushing disposed in and through the lateral roller component bore wherein the first crawler frame bushing abuts the roller component bushing.

In an exemplary embodiment of the undercarriage assembly, the first crawler frame bushing may be comprised of a first flanged end. In some embodiments, the undercarriage assembly may further comprise a roller component bushing disposed in and through the lateral roller component bore, wherein the first flanged end of the first crawler frame bushing abuts the roller component bushing. In some embodiments, the roller component bushing may be comprised of a first flanged end and the first flanged end of the first crawler frame bushing may abut the first flanged end of the roller component bushing.

In an exemplary embodiment of the undercarriage assembly, the undercarriage assembly may further comprise a second crawler frame bushing disposed in and through the second lateral crawler frame bore. In an exemplary embodiment of the undercarriage assembly, the undercarriage assembly may further comprise a roller component bushing disposed in and through the lateral roller component bore wherein the second crawler frame bushing abuts the roller component bushing.

In an exemplary embodiment of the undercarriage assembly, the second crawler frame bushing may be comprised of a first flanged end. In some embodiments, the undercarriage assembly may further comprise a roller component bushing disposed in and through the lateral roller component bore wherein the first flanged end of the second crawler frame bushing abuts the roller component bushing. In some embodiments, the roller component bushing may be comprised of a second flanged end wherein the first flanged end of the second crawler frame bushing may abut the second flanged end of the roller component bushing.

In an exemplary embodiment, the undercarriage assembly may further comprise a first seal disposed between the first flanged end of the first crawler frame bushing and the first flanged end of the roller component bushing. In some embodiments, the undercarriage assembly may further comprise a second seal disposed between the first flanged end of the second crawler frame bushing and the first flanged end of the roller component bushing.

In some embodiments, the first flanged end of the first crawler frame bushing may be comprised of wear-resistant material.

In some embodiments, the roller component may be a rear idler, load roller or front idler.

Other details, objects, and advantages of the invention will become apparent as the following description of certain present exemplary embodiments thereof and certain present exemplary methods of practicing the same proceeds.

BRIEF DESCRIPTION OF THE FIGURES

Embodiments of the invention, by way of example only, will be described with reference to the accompanying drawings in which.

DETAILED DESCRIPTION OF THE INVENTION

Figure 1:
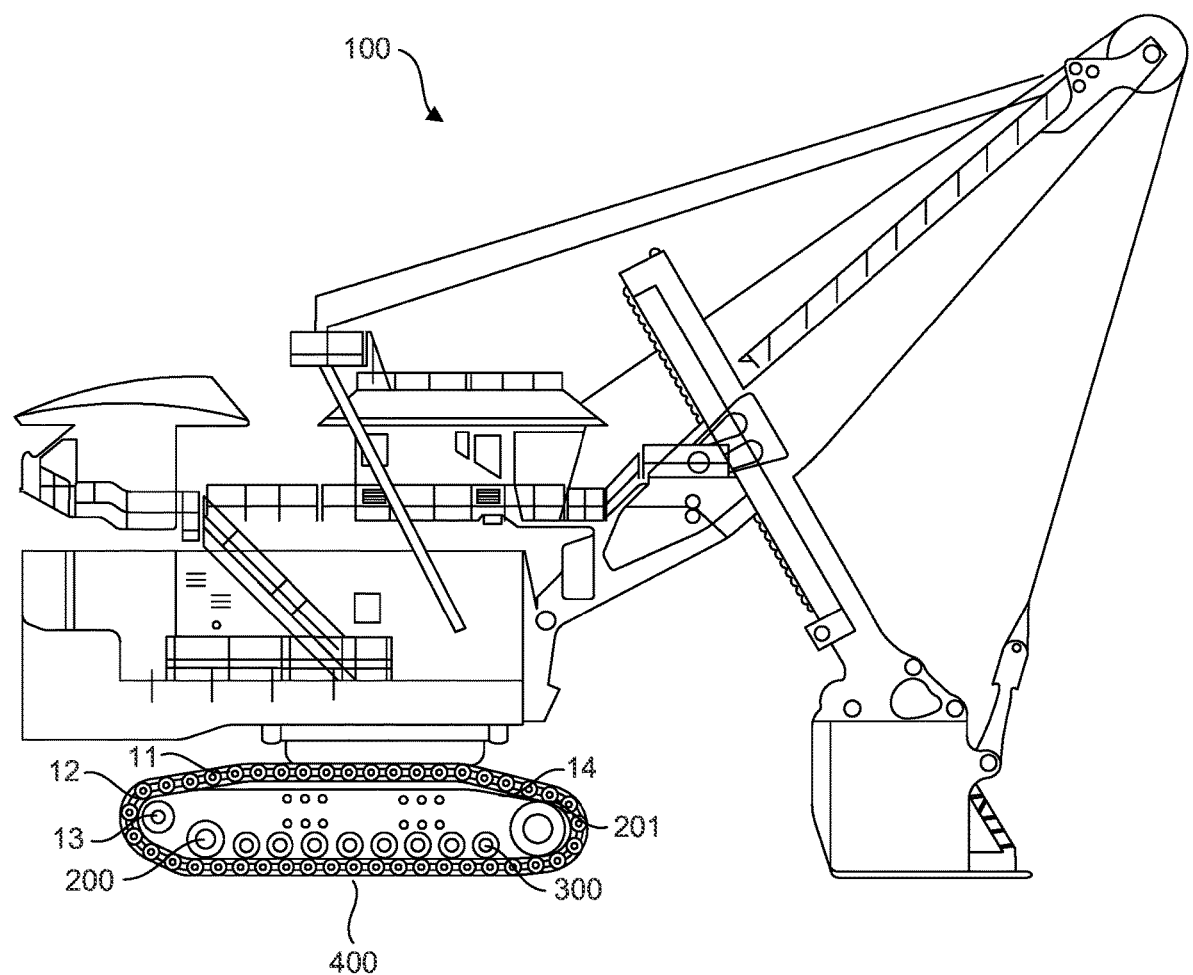
FIG. 1 shows an overview of a rope shovel with an undercarriage.

FIG. 1 depicts an electric rope shovel 100 with an undercarriage 400. The undercarriage 400 of a rope shovel 100 typically contains numerous undercarriage components, e.g. as shown in FIG. 1: a track pad 11, a drive tumbler 12, shafts or drive shafts 13, guide rails 14, a rear idler 200, a front idler 201 and numerous load (or lower) rollers 300. It is envisaged that the undercarriage assembly 1 described herein can be utilized on electric rope shovels 100 such as the one shown in FIG. 1.

Figure 2:
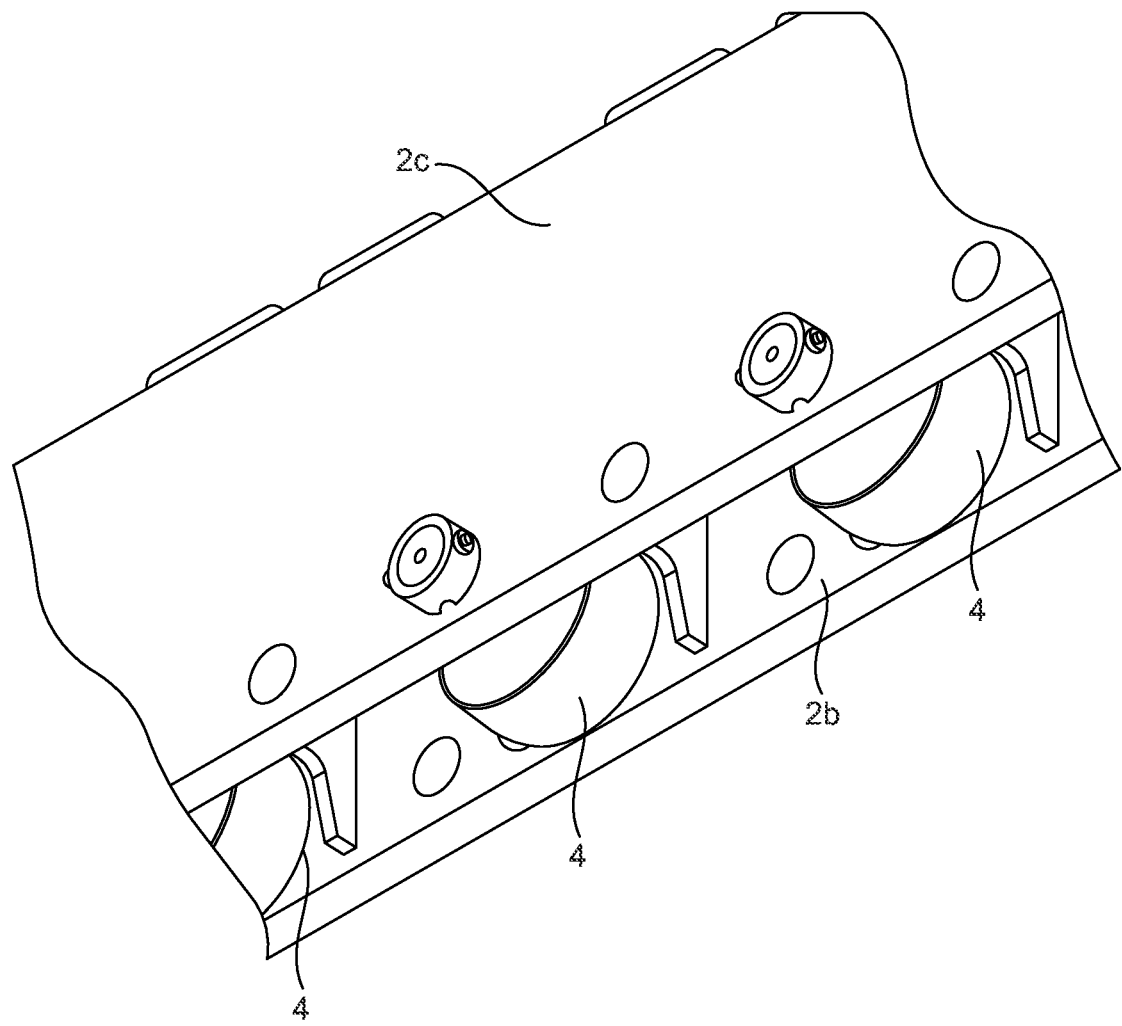
FIG. 2 shows an overview of an exemplary embodiment of the crawler frame and roller component.
Figure 3:
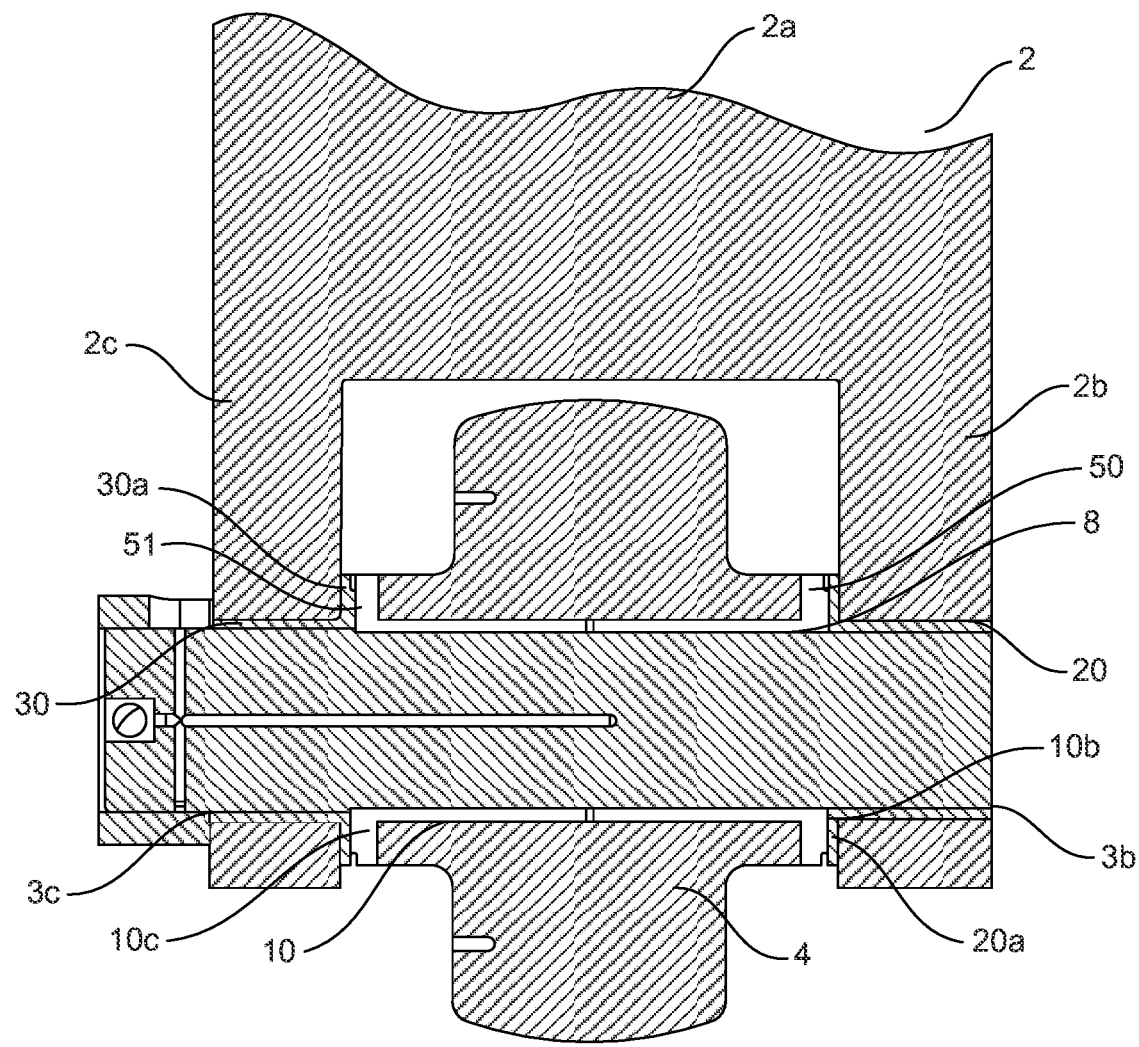
FIG. 3 shows a cross sectional view of an exemplary embodiment of the undercarriage assembly.

As shown in FIG. 2, an undercarriage 400 also typically contains a crawler frame 2, which is comprised of a crawler body 2a and first 2b and second legs 2c of the crawler frame, and a roller component 4. As best shown in FIG. 3, the first leg of the crawler frame 2b has a first lateral crawler frame bore 3b and the second leg of the crawler frame 2c has a second lateral crawler frame bore 3c. Typically the bores 3b and 3c are substantially on the same lateral plane such that a shaft can be disposed in or through the bores 3b, 3c. As further shown in FIG. 2, the roller component 4 is disposed below the crawler body 2 between the first leg 2b and the second leg 2c. The roller component 4 can be a rear idler 200, a load roller 300 or a front idler 201. The roller component 4 also has a lateral roller component bore 5, typically though the center of the roller component 4. The bores 3b, 3c, 5 are laterally aligned such that a shaft, e.g. a drive shaft 13, can be disposed therethrough.

FIG. 3 depicts an exemplary embodiment of the undercarriage assembly 1. As shown there can be a first crawler frame bushing 20 disposed in and through the first lateral crawler frame bore 3b. In some embodiments there is a second lateral crawler frame bushing 30 disposed in and through the second lateral crawler frame bore 3c. As shown in FIG. 3, there can be a roller component bushing 10 disposed in and through the lateral roller component bore 5. In other embodiments there is no roller component bushing 10 and the crawler frame bushing(s) 20, 30 abut the roller component 4. In some embodiments, the roller component bushing 10 can be comprised of steel. In some embodiments, the roller component bushing 10 can have a first flanged end 10b and/or a second flanged end 10c whereby the crawler frame bushing(s) 20, 30 abut the flanged end(s) 10b, 10c. In some embodiments the roller component bushing 10 is not flanged or only has one flanged end.

Figure 5:
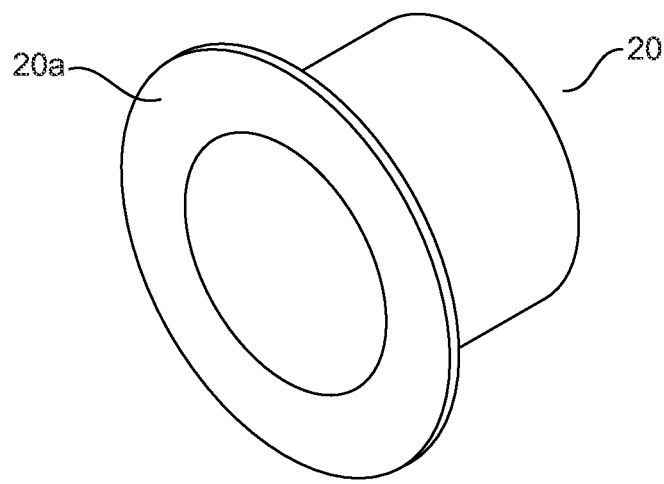
FIG. 5 shows an exemplary embodiment of the first crawler frame bushing with a first flanged end.

As shown in FIG. 5, the first and second crawler frame bushings 20, 30 can have flanged ends 20a, 30a. In some embodiments, the flanged ends 20a, 30a are equipped with wear-resistant material, e.g. the ends can have an induction hardened face such as tempered martensite. The first flanged ends 20a, 30a can abut the respective ends of the roller component bushing 10 and in embodiments where the roller component bushing 10 is flanged the first flanged ends 20a, 30a of the crawler bushing 20, 30 can abut the flanged end 10b, 10c of the roller component bushing 10. In some embodiments, the roller crawler frame bushing(s) 20, 30 can be comprised of bronze. In some embodiments the first and second crawler frame bushing 20, 30 are not flanged. The unflanged crawler frame bushings 20, 30 can abut the respective ends of the roller component bushing 10 and in embodiments where the roller component bushing 10 is flanged the crawler bushing 20, 30 can abut the flanged end 10b, 10c of the roller component bushing 10.

Figure 4:
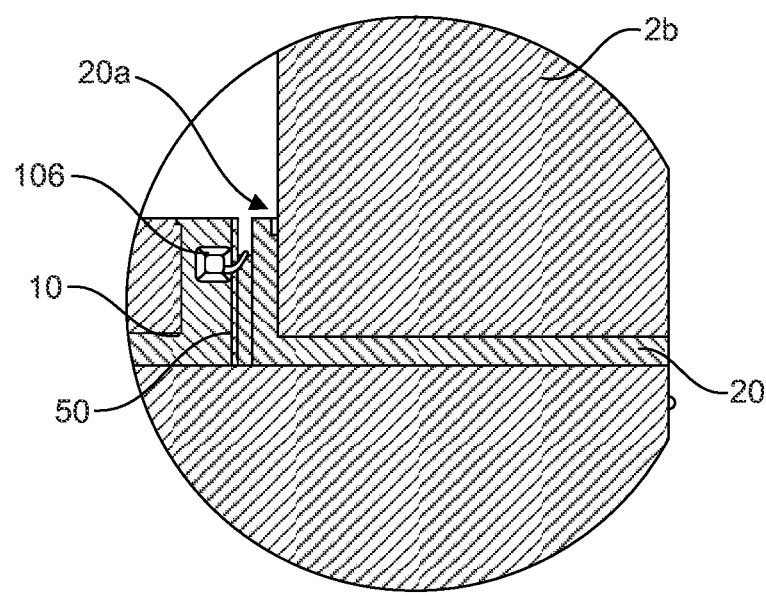
FIG. 4 shows a close-up cross sectional view of a portion of FIG. 3.

FIG. 4 depicts a close up of FIG. 3 and shows a first seal 50 disposed between the first flanged end 20a of the first crawler frame bushing 20 and the first flanged end 10b of the roller component bushing 10. In some embodiments, e.g. as shown in FIG. 3, there can be a second seal 51 disposed between the first flanged end 30a of the second crawler frame bushing 30 and the first flanged end 10c of the roller component bushing 10. As shown in FIG. 4, the seal(s) 50, 51 can be disposed inside the flanged end 20a of the bushing 20 of the first crawler frame bushing 20 resulting in a seal labyrinth having the ability to absorb thrust loads.

There are numerous advantages of the undercarriage assembly 1 described and claimed herein. In operation, the first/second crawler frame bushing(s) 20, 30 reduce wear on the crawler frame legs 2b, 2c which eliminates the need to weld build up and re-machine the bores 3b, 3c and inside faces of the first and second legs of the roller frame 2b, 2c when changing out the roller components 4 or shafts 13. In turn, the first/second crawler frame bushing(s) 20, 30 reduce maintenance costs and minimize downtime of the rope shovel 1 during maintenance because e.g. the crawler frame bushing 20, 30 engages with the roller component 4 or the roller component bushing 10 instead of the roller component 4 or the roller component bushing 10 directly engaging the first and second legs of the roller frame 2b, 2c.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

LIST OF COMPONENTS

1—undercarriage assembly
2—crawler frame
2a—crawler body
2b—first leg of crawler frame
2c—second leg of crawler frame
3b—first lateral crawler frame bore
3c—second lateral crawler frame bore
4—roller component
5—lateral roller component bore
10—roller component bushing
10b—first flanged end of roller component bushing
10c—second flanged end of roller component bushing
11—track pad
12—drive tumbler
13—drive shaft
14—guide rail
20—first crawler frame bushing
20a—first flanged end of first crawler frame bushing
30—second crawler frame bushing
30a—first flanged end of second crawler frame bushing
50—first seal
51—second seal
100—rope shovel
200—rear idler
201—front idler
300—load roller
400—undercarriage

The invention claimed is:

1. An undercarriage assembly for a rope shovel comprising:
   a crawler frame comprising a crawler body, a first leg and a second leg, the first leg having a first lateral crawler frame bore therethrough and the second leg having a second lateral crawler frame bore therethrough;
   a roller component disposed at least partially below the crawler body between the first leg and the second leg, the roller component having a lateral roller component bore therethrough;
   a first crawler frame bushing comprising a first flanged end, the first crawler frame bushing being disposed in and through the first lateral crawler frame bore;
   a roller component bushing comprising a first flanged end, the roller component bushing being disposed in and through the lateral roller component bore;
   wherein the first flanged end of the first crawler frame bushing abuts the first flanged end of the roller component bushing.

2. The undercarriage assembly of claim 1 further comprising:
   a second crawler frame bushing disposed in and through the second lateral crawler frame bore.

3. The undercarriage assembly of claim 2, wherein the second crawler frame bushing is comprised of a first flanged end.

4. The undercarriage assembly of claim 2 further comprising:
   a roller component bushing disposed in and through the lateral roller component bore,
   wherein the second crawler frame bushing abuts the roller component bushing.

5. The undercarriage assembly of claim 3 further comprising:
   a roller component bushing disposed in and through the lateral roller component bore,
   wherein the first flanged end of the second crawler frame bushing abuts the roller component bushing.

6. The undercarriage assembly of claim 5, wherein the roller component bushing is comprised of a second flanged end and wherein the first flanged end of the second crawler frame bushing abuts the second flanged end of the roller component bushing.

7. The undercarriage assembly of claim 1 further comprising:
   a first seal disposed between the first flanged end of the first crawler frame bushing and the first flanged end of the roller component bushing.

8. The undercarriage assembly of claim 6 further comprising:
   a second seal disposed between the first flanged end of the second crawler frame bushing and the first flanged end of the roller component bushing.

9. The undercarriage assembly of claim 1, wherein the first flanged end of the first crawler frame bushing is comprised of wear-resistant material.

10. The undercarriage assembly of claim 1, wherein the roller component is a rear idler, load roller or front idler.

* * * * *